Patented Apr. 1, 1930

1,752,693

UNITED STATES PATENT OFFICE

ALEXANDER S. RAMAGE, OF DETROIT, MICHIGAN

OXIDIZED RESIN AND PROCESS OF MAKING SAME

No Drawing.  Application filed January 12, 1926. Serial No. 80,827.

This invention is a novel product derivable from ordinary rosin or colophony by subjecting it in solution in a non-oxidizing solvent to the action of ozone or ozonized air. The invention comprises also the process of preparing the product.

I have found that if common rosin be dissolved in a suitable solvent, which is preferably a hydrocarbon of the olefin or naphthene type or a mixture of such hydrocarbons, and the solution subjected at a moderate temperature, preferably not exceeding about 200° F., to the action of ozonized air, or air which has been activated by passage through a silent electric discharge, the solution darkens and becomes progressively thicker and more viscous. Any vapors given off during this treatment are condensed and recovered, and may be utilized as explained below. The thickened solution thus prepared is admirably adapted for use as a varnish, or as a paint vehicle, and has the advantageous property, in contradistinction to rosin, of not livering when ground with active pigments such as red lead, zinc oxid and the like.

The chemical constitution of the product prepared as above has not yet been definitely determined, but inasmuch as it is made by subjecting rosin to strongly oxidizing conditions it may be regarded as an oxidized resin and will be so termed herein. This product is far less soluble than rosin in such hydrocarbons as have been mentioned above, but is freely soluble in the aromatic hydrocarbons, benzol, toluol, xylol, etc.

The oxidized resin may be recovered from solutions or colloidal suspensions prepared as above in various ways, one convenient method being to dilute the solution with an additional amount of the original solvent, or better with the condensed volatile product recovered during the oxidizing treatment. The oxidized resin is thereby precipitated, and the supernatant liquid may be run off and used to dissolve fresh rosin for a repetition of the operation. The last portions of the solvent may be eliminated by gentle heating in a current of air, by steaming, or by other appropriate methods.

To further purify the oxidized resin I prefer to dissolve the precipitate prepared as above in benzol, and then to re-precipitate it in the cold with a paraffin, olefin or naphthene hydrocarbon or a mixture of these. The oxidized resin is thereby thrown down as a dense precipitate, which after filtering, washing with the precipitating hydrocarbon and drying at low temperature, is recovered as a light-brown powder, melting at about 250° F. to a resinous mass.

The properties of the product will of course depend to some extent upon the duration and intensity of the oxidizing treatment to which it has been subjected, but in all cases these properties differ widely from those of the original rosin. A comparison of certain of these properties in a typical case is as follows:

|  | Rosin | Oxidized resin |
|---|---|---|
| Iodin number | 147 | 25. |
| Mean saponification equivalent | 305 | 187 |
| Per cent KOH required | 18.4 | 30 |
| Paraffins | Soluble. | Insoluble. |
| Olefins | Soluble. | Insoluble. |
| Benzol | Soluble. | Soluble. |
| Toluol | Soluble. | Soluble. |
| Xylol | Soluble. | Soluble. |
| Chloroform | Soluble. | Soluble. |
| Carbon tetrachloride | Soluble. | Insoluble. |
| Alcohol | Soluble. | Not very soluble. |
| Ether | Soluble. | Not very soluble. |
| Turpentine | Soluble. | Practically insoluble. |
| Hot linseed oil | Soluble. | Practically insoluble. |

A further and striking distinction between rosin and the oxidized resin is that whereas the metallic salts of the former, the so-called rosin soaps, are readily soluble in all common neutral solvents, such as those mentioned above, the corresponding salts or soaps of the oxidized resin are substantially insoluble in these solvents.

The hereindescribed oxidized resin is applicable for a wide variety of uses, including not only varnishes and paints as noted above, but in admixture with suitable fillers for plastic molding.

I claim:

1. Process of making an oxidized resin, comprising subjecting colophony in solution in a liquid hydrocarbon to the action of ozonized air, the solvent being a non-aromatic hydrocarbon in which the oxidized resin is substantially insoluble.

2. An oxidized resin prepared by subjecting colophony in solution in a liquid hydrocarbon to the action of ozonized air, the solvent being a non-aromatic hydrocarbon in which the oxidized resin is substantially insoluble, said oxidized resin having as compared with colophony, a low iodin number and saponification equivalent, a lesser degree of solubility in most neutral solvents, and forming soaps of relatively slight solubility in said solvents.

In testimony whereof, I affix my signature.

ALEXANDER S. RAMAGE.